United States Patent [19]

Quinn

[11] 4,430,484
[45] Feb. 7, 1984

[54] POLYESTER-CARBONATE RESIN BLENDS

[75] Inventor: Clayton B. Quinn, Mount Vernon, Ind.

[73] Assignee: General Electric Company, Mt. Vernon, Ind.

[21] Appl. No.: 412,719

[22] Filed: Aug. 30, 1982

Related U.S. Application Data

[63] Continuation of Ser. No. 225,058, Jan. 14, 1981, abandoned.

[51] Int. Cl.³ .................. C08L 67/00; C08L 69/00; C08L 77/10; C08L 79/08
[52] U.S. Cl. .................. 525/425; 525/422; 525/433
[58] Field of Search .................. 525/422, 425, 433

[56] References Cited

U.S. PATENT DOCUMENTS

| | | | |
|---|---|---|---|
| 3,714,772 | 2/1973 | Bhakuni | 525/425 |
| 3,770,697 | 11/1973 | Holub | 525/422 |
| 4,220,563 | 9/1980 | Hara | 525/425 |

FOREIGN PATENT DOCUMENTS

| | | | |
|---|---|---|---|
| 46-20268 | 6/1971 | Japan | 525/425 |
| 51-30256 | 3/1976 | Japan | 525/425 |
| 55-50061 | 4/1980 | Japan | 525/425 |
| 55-133446 | 10/1980 | Japan | 525/425 |

*Primary Examiner*—Paul Lieberman
*Attorney, Agent, or Firm*—Martin B. Barancik

[57] ABSTRACT

Novel thermoplastic compositions are disclosed which comprise blends of:
  (a) a polyester-carbonate resin; and
  (b) at least one polymer selected from the group consisting of (i) polyamides, (ii) polyimides, (iii) polyamideimides, and (iv) mixtures thereof.

15 Claims, No Drawings

POLYESTER-CARBONATE RESIN BLENDS

This is a continuation, of copending application Ser. No. 225,058, filed Jan. 14, 1981 now abandoned.

This invention is directed to a thermoplastic composition comprised of a blend of polymers. More particularly it is directed to a blend of (a) a polyester-carbonate resin, and (b) at least one polymer selected from the group consisting of (i) polyamides, (ii) polyimides, and (iii) polyamideimides.

BACKGROUND OF THE INVENTION

Polyester-carbonates are known thermoplastic resins whose many excellent physical properties allow them to be used successfully in many commercial and industrial applications. This is especially true of aromatic polyester-carbonates. However, in some applications a material having a higher heat distortion temperature, higher flexural strength and greater tensile strength than aromatic polyester-carbonate resin is required.

The addition of various additives in attempting to provide an aromatic polyester-carbonate resin which has a higher heat distortion temperature, higher flexural strength and greater tensile strength have produced mixed results. In some instances there was no improvement in the heat distortion temperature, flexural strength, or the tensile strength of the polymer. In other instances the addition of certain additives to the aromatic polyester-carbonate resulted in a polymer having a higher heat distortion temperature, higher flexural strength and greater tensile strength, but this was accomplished only at the expense of some of the other valuable properties of the polyester-carbonate.

This is due to the fact, well known to those skilled in the art, that the area of modification of the physical properties of a polymer by the addition of various additives thereto is largely an empirical art rather than a predictable science with little, if any, predictability on the effects a particular additive will have in a particular polymer.

Thus, while a particular additive may have one effect in one polymer system the same additive may well produce entirely different results when used in another and different polymer system. Likewise, two rather closely related additives may produce entirely different results when added to the same polymer system.

There thus exists a need for an aromatic polyester-carbonate resin which has a higher heat distortion temperature, greater tensile and flexural strength, and yet retains all of the advantageous physical properties of an unmodified aromatic polyester-carbonate.

DESCRIPTION OF THE INVENTION

The instant invention is described to novel thermoplastic compositions containing a blend of (a) an aromatic polyestercarbonate resin, and (b) at least one resin selected from the group consisting of (i) polyamides, (ii) polyimides, and (iii) polyamideimides. These compositions have improved heat distortion temperatures, flexural strength and tensile strength compared to unmodified aromatic polyester-carbonates.

The polyester-carbonates which find use in the instant invention and the methods for their preparation are well known in the art as disclosed in U.S. Pat. Nos. 3,303,331; 3,169,121; 4,194,038 and 4,156,069, as well as in copending application Ser. No. 33,389 filed Apr. 26, 1979 and assigned to the same assignee as the instant application, all of which are incorporated herein by reference.

The polyester-carbonates can generally be termed copolyesters containing carbonate groups, carboxylate groups, and aromatic carbocyclic groups in the polymer chain, in which at least some of the carboxylate groups and at least some of the carbonate groups are bonded directly to ring carbon atoms of the aromatic carbocyclic groups. These polyester-carbonates are, in general, prepared by reacting a difunctional carboxylic acid or a reactive derivative of the acid such as the acid dihalide, a dihydric phenol and a carbonate precursor.

The dihydric phenols useful in formulating the polyester-carbonates which are of use in the practice of the present invention are in general represented by the general formula

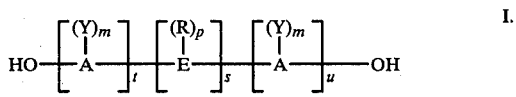

I.

wherein A represents an aromatic group such as phenylene, biphenylene, naphthylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group, it may also consist of two or more alkylene or alkylidene groups connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group (e.g., cyclopentyl, cyclohexyl, etc.); a sulfur-containing linkage, such as sulfide, sulfoxide or sulfone; an ether linkage; a carbonyl group; a tertiary nitrogen group; or a silicon-containing linkage such as silane or siloxy. Other groups which E may represent will occur to those skilled in the art. R represents hydrogen or a monovalent hydrocarbon group such as alkyl (methyl, ethyl, propyl, etc.), aryl (phenyl, naphthyl, etc.), aralkyl (benzyl, ethylphenyl, etc.), or cycloaliphatic (cyclopentyl, cyclohexyl, etc.). Y may be an inorganic atom such as halogen (fluorine, bromine, chlorine, iodine), an inorganic group such as the nitro group, an organic group such as R above, or an oxy group such as OR, it being only necessary that Y be inert to and unaffected by the reactants and reaction conditions. The letter m represents any integer from and including zero through the number of positions on A available for substitution; p represents an integer from and including zero through the number of positions on E available for substitution; t represents an integer equal to at least one; s is either zero or one; and u represents an integer including zero.

In the dihydric phenol compound represented by Formula I above, when more than one Y substituent is present, they may be the same or different. The same holds true for the R substituent. Where s is zero in Formula I and u is not zero, the aromatic rings are directly joined with no intervening alkylene or other bridge. The positions of the hydroxyl groups and Y on the aromatic nuclear residues A can be varied in the ortho, meta, or para positions and the groupings can be in a vicinal, asymmetrical or symmetrical relationship, where two or more ring carbon atoms of the hydrocarbon residue are substituted with Y and hydroxyl groups.

Some nonlimiting examples of dihydric phenols falling within the scope of Formula I include:
2,2-bis(4-hydroxyphenyl)propane (bisphenol A);
2,4'-dihydroxydiphenylmethane;
bis(2-hydroxyphenyl)methane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
1,1-bis(4-hydroxy-2-chlorophenyl)ethane;
2,2-bis(3-phenyl-4-hydroxyphenyl)propane;
bis-(4-hydroxyphenyl)-cyclohexylmethane; and
2,2-bis(4-hydroxyphenyl)-1-phenylpropane.

These dihydric phenols may be used alone or as mixtures of two or more different dihydric phenols.

In general, any difunctional carboxylic acid, or its reactive derivative such as the acid dihalide, conventionally used in the preparation of polyesters may be used for the preparation of the polyester-carbonates useful in formulating the compositions of the present invention. In general, the carboxylic acids which may be used are aliphatic carboxylic acids, aliphatic-aromatic carboxylic acids, or aromatic carboxylic acids. The aromatic dicarboxylic acids or their reactive derivatives such as the aromatic acid dihalides are preferred as they produce the aromatic polyester-carbonates which are most useful in the practice of the present invention.

These carboxylic acids may be represented by the general formula $$R^2\text{---}(R^1)_q\text{COOH} \qquad \text{II}$$

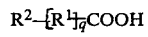

wherein $R^1$ represents an alkylene, alkylidene or cycloaliphatic group in the same manner as set out above for E in Formula I; an alkylene, alkylidene or cycloaliphatic group containing ethylenic unsaturation; an aromatic radical such as phenylene, naphthylene, biphenylene, substituted phenylene, etc.; two or more aromatic groups connected through non-aromatic linkages such as those defined by E in Formula I; or an aralkyl radical such as tolylene, xylene, etc. $R^2$ is either a carboxyl or a hydroxyl group. The letter q represents one where $R^2$ is a hydroxyl group and either zero or one wherein $R^2$ is a carboxyl group. Thus the difunctional acid will either be a monohydroxy monocarboxylic acid or a dicarboxylic acid. For purposes of the present invention the dicarboxylic acids or their reactive derivatives such as the acid dihalides are preferred, with the aromatic dicarboxylic acids or their dihalides being more preferred. Thus, in these more preferred acids $R^2$ is a carboxyl group and $R^1$ is an aromatic radical such as phenylene, naphthylene, biphenylene, substituted phenylene, etc.; two or more aromatic groups connected through non-aromatic linkages; or an aralkyl group. Some nonlimiting examples of suitable preferred aromatic and aliphatic-aromatic dicarboxylic acids which may be used in preparing the polyester-carbonates useful in the practice of the present invention include phthalic acid, isophthalic acid, terephthalic acid, homophthalic acid, o-, m-, and p-phenylenediacetic acid; the polynuclear aromatic acids such as diphenic acid, and 1,4-naphthalic acid.

These acids may be used either individually or as a mixture of two or more different acids.

The carbonate precursor may be either a carbonyl halide, a carbonate ester or a haloformate. The carbonyl halides which can be employed herein are carbonyl chloride, carbonyl bromide and mixtures thereof. Typical of carbonate esters which may be employed herein are diphenyl carbonate, di(halophenyl) carbonates such as di(chlorophenyl)carbonate, di(bromophenyl)carbonate, di(trichlorophenyl)carbonate, di(tribromophenyl)carbonate, etc., di(alkylphenyl)carbonates such as di(tolyl)carbonate, etc., di(naphthyl)carbonate, di(chloronathyl)carbonate, phenyl tolyl carbonate, chlorophenyl chloronaphthyl carbonate, etc., or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). Carbonyl chloride, also known as phosgene, is preferred.

Also present during the co-reaction between the dihydric phenol, the carbonate precursor and the dicarboxylic acid or its reactive derivative are catalysts, molecular weight regulators, and acid acceptors. Examples of suitable molecular weight regulators include phenol, tertiary butyl phenol, etc. Examples of suitable catalysts include include tertiary amines, quaternary ammonium compounds, quaternary phosphonium compounds, etc. Examples of suitable acid acceptors include tertiary amines, alkali or alkaline earth metal hydroxides, etc.

The polyester-carbonates which are useful in the practice of the present invention are the aromatic polyester-carbonates derived from dihydric phenols, aromatic dicarboxylic acids or their reactive derivatives such as the aromatic acid dihalides, e.g., dichlorides, and phosgene. A quite useful class of aromatic polyester-carbonates are those derived from bisphenol A; terephthalic acid, isophthalic acid, or a mixture of isophthalic and terephthalic acids or isophthaloyl chloride, terephthaloyl chloride, or a mixture of isophthaloyl and terephthaloyl chloride; and phosgene. If a mixture of terephthaloyl and isophthaloyl dichloride is present the ratio by weight of terephthaloyl dichloride to isophthaloyl dichloride is from about 5:95 to 95:5.

The instant invention is directed to novel compositions, more particularly novel thermoplastic molding compositions, containing polymer blends comprised of:
(a) an aromatic polyester-carbonate resin; and
(b) at least one polymer selected from the group consisting of (i) polyamides, (ii) polyimides, and (iii) polyamideimides.

The polyamides and their preparation are well known to those skilled in the art. For purposes of the present invention the aromatic polyamides are preferred. These aromatic polyamides are represented by the general formula

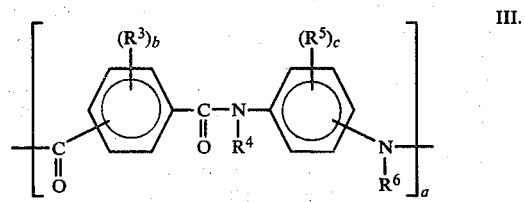

wherein each $R^3$ and each $R^5$ are independently selected from alkyl radicals of from 1 to about 12 carbon atoms, halogen radicals, and substituted alkyl radicals containing from 1 to about 12 carbon atoms and substituent groups such as halogen and/or oxy groups such as $OR^7$ wherein R[7] is an alkyl group containing from 1 to about 10 carbon atoms; R[4] and R[6] are independently selected from alkyl radicals of from 1 to about 12 carbon atoms, hydrogen, aryl radicals of from 6 to 18 carbon atoms, aralkyl radicals of from 7 to 18 carbon atoms, and alkaryl radicals of from 7 to 18 carbon atoms; and a represents a number having a value from 10 to about 500; b represents an integer having a value from 0 to the number of replaceable hydrogen atoms on the aromatic ring, i.e., 4, inclusive; and c represents an integer having a value from 0 to the number of replaceable hydrogen atoms on the aromatic ring, i.e., 4, inclusive.

Illustrative of compounds falling within the scope of Formula III, is one wherein b and c are 0, and R[4] and R[6] represent hydrogen. Such polyamides are marketed by the E. I. DuPont Company under the tradename Nomex and Kevlar.

The polyamideimides and their preparation are likewise well known to those skilled in the art. For purposes of the present invention the aromatic polyamideimides are preferred. These aromatic polyamideimides are represented by the general formula

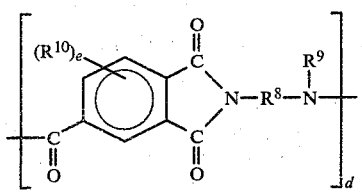

wherein each R[10] is independently selected from the group consisting of alkyl radicals of from 1 to about 12 carbon atoms, halogen, and substituted alkyl radicals containing from 1 to about 12 carbon atoms and substituent groups such as halogen and/or oxy groups represented by the formula OR[11] wherein R[11] is an alkyl radical of from 1 to about 12 carbon atoms; R[9] is selected from the group consisting of hydrogen, alkyl radicals of from 1 to about 12 carbon atoms, aryl radicals of from 6 to 18 carbon atoms, aralkyl radicals of from 7 to about 18 carbon atoms, and aralkyl radicals of from 7 to about 18 carbon atoms. R[8] in Formula IV is selected from the group consisting of divalent aromatic organic radicals having from 6 to about 30 carbon atoms; alkylene radicals having from 2 to about 20 carbon atoms; alkylidene radicals having from 2 to about 20 carbon atoms; and cycloalkylene radicals containing from about 3 to about 8 carbon atoms. Radicals included by R[8] are, for example, aromatic hydrocarbon radicals and halogenated aromatic hydrocarbon radicals, for example, phenylene, tolylene, chlorophenylene, naphthylene, etc. The letter e represents an integer having a value from 0 to the number of replaceable hydrogen atoms present on the aromatic ring, i.e., 3, inclusive; and d is a number having a value from about 10 to about 500.

Illustrative of compounds falling within the scope of Formula IV is one wherein e is 0. R[9] is hydrogen, and R[8] is an alkylene or arylene radical. Such polyamideimides are marketed by the Amoco Corporation under the tradename Torlon.

The polyimides are also known compounds whose preparation and properties are well known to those skilled in the art. For the purposes of the instant invention the polyetherimides are the preferred polyimides. The polyetherimides and are disclosed in U.S. Pat. Nos. 3,803,085 and 3,905,942, both of which are incorporated herein by reference. These polyetherimides are represented by the general formula

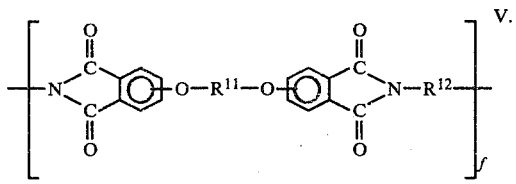

wherein f has a value from about 10 to about 500; and R[12] is a divalent aliphatic hydrocarbon radical containing from 2 to about 12 carbon atoms, a divalent aromatic hydrocarbon or halogenated hydrocarbon radical containing from 6 to 18 carbon atoms, or a divalent cycloaliphatic hydrocarbon radical containing from 3 to about 10 carbon atoms. R[11] is a divalent aromatic organic radical having from 6 to 30 carbon atoms. Radicals included by R[11] are, for example, aromatic hydrocarbon radicals and halogenated aromatic hydrocarbon radicals, for example, phenylene, tolylene, chlorophenylene, naphthalene, etc., and radicals included by the formula

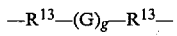

$$-R^{13}-(G)_g-R^{13}-$$  VI wherein R[13] is a divalent aromatic radical having from 6–13 carbon atoms selected from hydrocarbon radicals and halogenated hydrocarbon radicals, and G is a divalent organo radical selected from

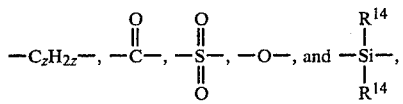

where g is 0 or 1, z is an integer having a value of from 1–5 inclusive, and R[14] is a monovalent hydrocarbon radical selected from methyl, phenyl, etc.

Illustrative of a compound falling within the scope of Formula V is one wherein R[12] is phenylene and R[11] is

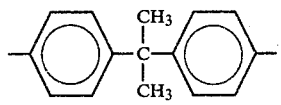

Such a compound is marketed by the General Electric Company under the tradename Ultem.

In the practice of the instant invention the aromatic polyester-carbonates are admixed with at least one polymer represented by Formula III, Formula IV or Formula V to form the novel compositions of the present invention. The instant compositions can contain, in addition to the aromatic polyester-carbonate, only one polymer of Formula III, only one polymer of Formula IV, or only one polymer of Formula V; or they may contain a mixture of two or more polymers. Thus for example, the instant composition can contain (a) an aromatic polyester-carbonate, and (b) a polyamide of Formula III and a polyamideimide of formula IV; (a) an aromatic polyester-carbonate, and (b) a polyimide of Formula V; (a) a polyester-carbonate, and (b) two different polyimides of Formula V; or (a) an aromatic polyester-carbonate, and (b) a polyamide of Formula III and a polyimide of Formula V and a polyamideimide of Formula IV.

Generally, the instant compositions contain from about 1 part by weight of the polyester-carbonate to 99 parts by weight of at least one compound of Formulae III, IV, or V to 99 parts by weight of the aromatic polyester carbonate to 1 part by weight of at least one compound of Formulae III, IV, or V. Preferably the ratio in parts by weight of the aromatic polyester-carbonate to the polymer selected from the group consisting of polyamides, polyimides, polyamideimides, or mixtures thereof ranges from 30:70 to 70:30, and more preferably from about 40:60 to 60:40.

The compositions of the instant invention may also optionally contain the commonly known and used additives such as antioxidants, antistatic agents, mold release agents, colorants, impact modifiers, ultraviolet radiation absorbers, plasticizers, fillers such as glass, talc, $CaSO_4$, mica, carbon fibers, mineral clay, etc., color stabilizers, hydrolytic stabilizers, and flame retardants such as, for example, those described in U.S. Pat. Nos. 3,915,926 and 4,197,232, the disclosures of which are incorporated herein by reference.

DESCRIPTION OF THE PREFERRED EMBODIMENT

The following examples are set forth to further illustrate the present invention and are not to be construed as limiting the invention thereto. Unless otherwise specified, where parts or percents are mentioned, they are parts or percents by weight.

EXAMPLE 1

This example illustrates an aromatic polyester-carbonate resin which is not blended with any of the afore-described polymers. Thus this example illustrates a composition falling outside the scope of the instant invention.

To a ten gallon reactor vessel there are added 8 liters of methylene chloride, 6 liters of water, 1,906 grams (8.36 moles) of bisphenol A, 20 milliliters of triethylamine, 4 grams of sodium gluconate, and 65 grams of p-tertiary butylphenol molecular weight regulator. At a pH of between about 9–10.5, 1,089.6 grams (5.37 moles) of a mixture of 15% by weight of isophthaloyl dichloride and 85% by weight of terephthaloyl dichloride in 2 liters of methylene chloride are added over a 10 minute interval while controlling the pH at about 9–10.5 with 35% aqueous caustic. After the addition of the diacid chloride mixture phosgene is added at a rate of 36 grams per minute for 12 minutes while controlling the pH at about 10–11 with 35% aqueous caustic. The polymer mixture is diluted with 5 liters of methylene chloride and the brine phase is seprated by centrifuge. The resulting polymer phase is washed with aqueous acid and water and is then recovered by high pressure steam precipitation to yield a white powder having an Intrinsic Viscosity of 0.5 dl/g in methylene chloride at 25° C. To this resin powder is added a minor amount (about 0.1 parts by weight per hundred parts by weight of resin) of a stabilizer mixture containing a phosphite color stabilizer and an epoxy stabilizer. This resin product is then fed to an extruder operating at a temperature of about 600° F. to extrude the resin into strands and the extruded strands are chopped into pellets. The pellets are then injection molded at about 650° F. into test samples measuring about $2\frac{1}{2}'' \times \frac{1}{2}'' \times \frac{1}{8}''$.

EXAMPLE 2

This example illustrates a composition of the present invention which contains a blend of an aromatic polyester-carbonate and a polyetherimide.

An aromatic polyester-carbonate resin is prepared substantially in accordance with the procedure of Example 1. The powdered polyester-carbonate resin is mixed, in a 50:50 ratio by weight, with a polyetherimide resin represented by formula V wherein $R^{12}$ is a phenylene radical and $R^{11}$ is the

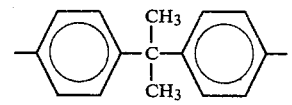

radical. This resin blend is then fed to an extruder operating at a temperature of about 650° F. to extrude the resin into strands and the extruded strands are chopped into pellets. The pellets are then injection molded at about 650° F. into test samples measuring about $2\frac{1}{2}'' \times \frac{1}{2}'' \times \frac{1}{8}''$.

Various physical properties of the test samples obtained in Examples 1 and 2 were determined according to the following test procedures;

Heat Distortion Temperature Under Load (DTUL) of the molded samples was determined according to ASTM D-648;

Notched Izod (NI) impact on the $\frac{1}{8}''$ thick molded samples was determined according to ASTM D-256;

Flexural Yield (FY) and Flexural Modulus (FM) were determined according to ASTM D-790;

Flame Retardancy (FR) of the molded samples was determined by subjecting the sample (5 samples for each Example) to the test procedures set forth in Underwriters' Laboratories, Inc. Bulletin UL-94, Burning Test for Classifying Materials. In accordance with this test procedure, materials so investigated are rated either V-O, V-I or V-II based on the results of 5 specimens. The criteria for each V (for vertical) rating per UL-94 is briefly as follows:

"V-O": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not exceed 25 seconds and the glowing does not travel vertically for more than $\frac{1}{8}''$ of the specimen after flaming ceases and glowing is incapable of igniting absorbent cotton.

"V-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94 but by the standard of the present invention, as "burns." Further, UL-94 requires that all test bars in each test group must meet the V-type rating to achieve that particular classification. Otherwise, the 5 bars receive the rating of the worst single bar.

The results of these tests are set forth in table I.

TABLE I

|  | Example 1 | Example 2 |
|---|---|---|
| (FY) in p.s.i. | 14,000 | 17,700 |
| (FM) in p.s.i. | 310,000 | 389,000 |
| (DTUL) at 264 p.s.i., °F. | 325 | 340 |
| (NI) ft.lb./in. | 6.0 | 2.0 |
| (FR) | V-II | V-O |

In formulating the compositions of the instant invention the resins are admixed together and mixed or blended together by generally mechanical means such as stirring, shaking, blending in a mechanical blender, etc.

As seen from the data in Table I the resin blends of the instant invention, Example 2, have a higher heat distortion temperature, higher flexural yield and higher flexural modulus than the unblended aromatic polyester-carbonate, Example 1. Additionally, the compositions of the present invention are more flame retardant than the unblended aromatic polyester-carbonate.

It will thus be seen that the objects set forth above among those made apparent from the preceding description, are efficiently attained, and since certain changes may be made in carrying out the above process and the compositions set forth without departing from the scope of the invention, it is intended that all matters contained in the above description shall be interpreted as illustrative and not in a limiting sense.

I claim:

1. A thermoplastic composition comprising in admixture
   (a) an aromatic polyester-carbonate and
   (b) an aromatic polyester-carbonate heat distortion improving effective amount of at least one polymer selected from the group consisting of
   (i) aromatic polyamide of the formula

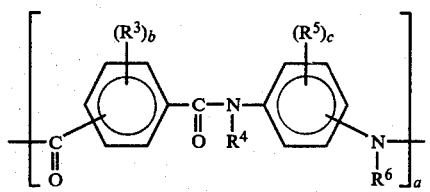

wherein
   $R^3$ and $R^5$ are independently selected from halogen, alkyl of one to twelve carbon atoms, and substituted alkyl wherein the substituent is halogen or $OR^7$ wherein $R^7$ is an alkyl of one to ten carbon atoms;
   $R^4$ and $R^6$ are independently selected from alkyl of one to twelve carbon atoms, hydrogen, aryl of six to eighteen carbon atoms, aralkyl of seven to eighteen carbon atoms, and alkaryl of seven to eighteen carbon atoms;
   a is from 10 to abut 500;
   b and c are independently selected from an integer of 0 to 4.
   (ii) aromatic polyamideimides
   (iii) polyimides.

2. The composition of claim 1 wherein said aromatic polyester-carbonate is derived from a dihydric phenol, a carbonate precursor, and an aromatic dicarboxylic acid or a reactive derivative thereof.

3. The composition of claim 2 wherein said dihydric phenol is bisphenol A.

4. The composition of claim 3 wherein said carbonate precursor is phosgene.

5. The composition of claim 4 wherein said aromatic dicarboxylic acid is selected from the group consisting of isophthalic acid, terephthalic acid, and mixtures thereof; and wherein the reactive derivative of said acid is selected from the group consisting of terephthaloyl dichloride, isophthaloyl dichloride, and mixtures thereof.

6. The composition of claim 5 wherein said aromatic polyester-carbonate is a copolymer resulting from the condensation of bisphenol-A with terephthaloyl dichloride, isophthaloyl dichloride and phosgene.

7. The composition of claim 1 wherein said polyamideimide is represented by the general formula

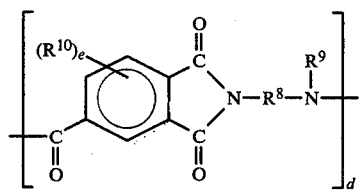

wherein each $R^{10}$ is independently selected from the group consisting of alkyl radicals, halogen radicals, and substituted alkyl radicals; $R^9$ is selected from the group consisting of hydrogen, alkyl radicals, aryl radicals, aralkyl radicals, and alkaryl radicals; $R^8$ is selected from the group consisting of divalent aromatic organic radicals having from 6 to about 30 carbon atoms, alkylene radicals, alkylidene radicals, and cycloalkylene radicals; d has a value from about 10 to about 500; and e is an integer having a value from 0 to 3 inclusive.

8. The composition of claim 7 wherein said divalent aromatic organic radicals are selected from the group consisting of divalent aromatic hydrocarbon radicals and divalent halogenated aromatic hydrocarbon radicals.

9. The composition of claim 1 wherein said polyimides ae polyetherimides.

10. The composition of claim 9 wherein said polyetherimides are represented by the general formula

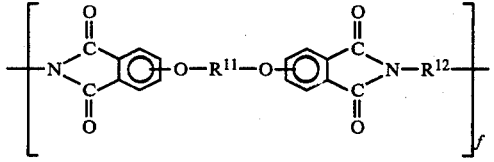

wherein f has a value from about 10 to about 500; $R^{12}$ is selected from the group consisting of divalent aliphatic hydrocarbon radicals, divalent aromatic hydrocarbon radical, and divalent cycloaliphatic hydrocarbon radicals; and $R^{11}$ is a divalent aromatic organic radical having from 6 to 30 carbon atoms.

11. The composition of claim 10 wherein $R^{11}$ is selected from the group consisting aromatic hydrocarbon radicals; halogenated aromatic hydrocarbon radicals; and radicals included by the formula

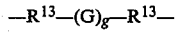

wherein $R^{13}$ is a divalent aromatic radical having from 6–13 carbon atoms selected from hydrocarbon radicals and halogenated hydrocarbon radicals, and G is a divalent organo radical selected from

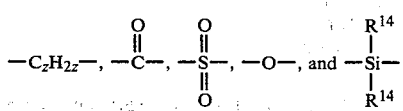

where g is zero or one, z is an integer having a value from 1 to 5, and $R^{14}$ is a monovalent alkyl, aryl, alkaryl or aralkyl radical.

12. The composition of claim 11 wherein $R^{11}$ is the

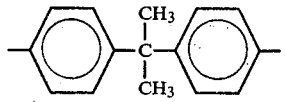

radical.

13. The composition of claim 12 wherein $R^{12}$ is a phenylene radical.

14. The composition of claim 13 wherein the aromatic polyester-carbonate is a copolymer resulting from the condensation of bisphenol A with terephthaloyl dichloride, isophthaloyl dichloride and phosgene.

15. The composition of claim 1 which contains from about 30 to about 70 parts by weight of (a) and from about 70 to about 30 parts by weight of (b) as measured by total parts of (a) and (b).

* * * * *